Dec. 10, 1963 C. A. TERRY 3,113,541
CLIP
Filed March 29, 1960
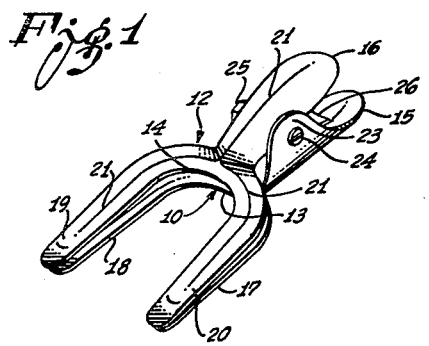
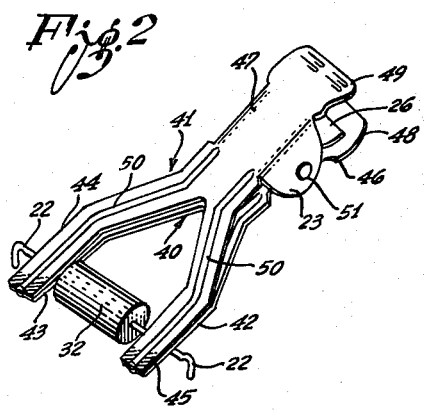
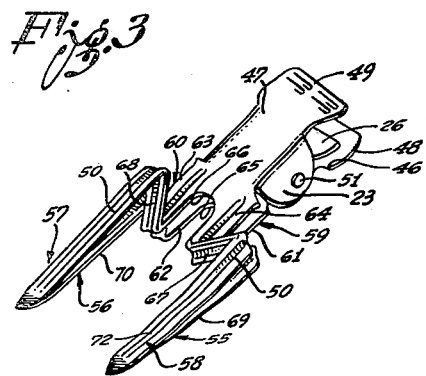
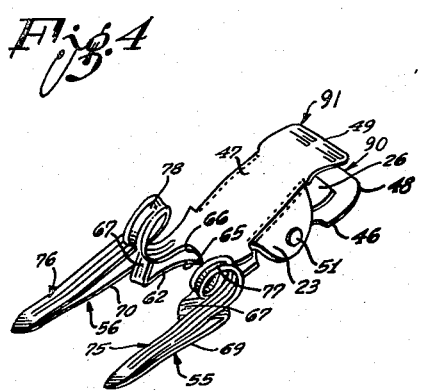
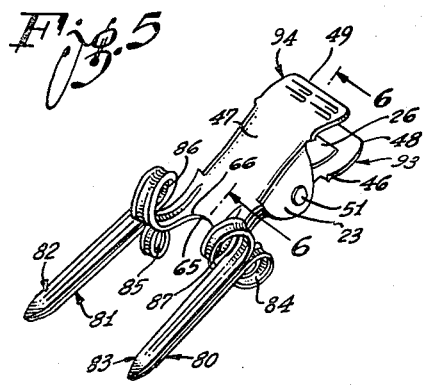
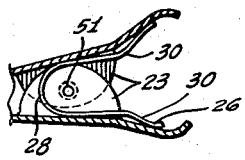
INVENTOR:
Clayton A. Terry
By Willard M. Graham
Agent.

United States Patent Office 3,113,541
Patented Dec. 10, 1963

3,113,541
CLIP
Clayton A. Terry, Manhattan Beach, Calif., assignor to Northrop Corporation, Beverly Hills, Calif., a corporation of California
Filed Mar. 29, 1960, Ser. No. 18,279
3 Claims. (Cl. 113—111)

This invention has to do with electronics or more particularly with tooling and accessories to be used in the assembly of electronic equipment and modules.

The rapidly increasing use and application of electronic and electrical equipment has brought with it an increasing demand for reliable procedures and tooling for assembly. Further, electrical and electronic components are becoming more and more delicate; i.e. very sensitive to environmental conditions relative to assembly. These environmental conditions can radically alter the value of the components which will, obviously, result in rejections of the electronic equipment or, more seriously, result in failure of the equipment when placed in operation. Therefore, it is important that some procedure be adopted which will provide a control for undesirable environmental conditions One of the conditions that needs to be controlled is that of heat that is transmitted from a soldering iron through the component leads to the component. This heat, as is well known, may very materially alter the value of a resistor, capacitor, diode, or transistor.

Therefore, it is an object of this invention to provide a clip that is placed in close proximity to an electronic component, prior to the soldering thereof, which will have the heat transferred thereinto instead of into the component.

Another object of this invention is to provide a clip that is made of readily available materials, is economical to fabricate, and is subject to mass production techniques.

Briefly the invention comprises a clip that has a pair of interconnected U-shaped bodies that are spring loaded to the normally closed position. A ridge or bead is provided on certain portions of the clip in order that a desirable amount of rigidity may be incorporated therein.

FIGURE 1 is a perspective view illustrating and having embodied therein one form of the invention.

FIGURE 2 is a perspective view illustrating another form of the invention and also showing the type of component with which it is associated.

FIGURE 3 is a perspective view of still another form of the invention.

FIGURE 4 is a perspective view of a modified form of the invention.

FIGURE 5 is another perspective view illustrating still another modified form of the invention.

FIGURE 6 is a cross-sectional view taken on line 6—6 of FIGURE 5 looking in the direction indicated.

Referring to the drawings, particularly FIGURE 1, for a more detailed description of the present invention, which is in the nature of a clip, 10 and 12 broadly designate a pair of substantially identical U-shaped bodies. The bodies 10 and 12 are hereafter referred to as the first and second body members, respectively. Integral with each of the body members and extending from the bights 13 and 14 thereof are manually operated and elongated handles 15 and 16. Formed in each of the legs 17, 18, 19, and 20 and bights 13 and 14 of each of the body members 10 and 12 and each of the handles 15 and 16 is a reinforcing or stiffening rib 21.

The extreme free end of each leg 17, 18, 19, and 20 is substantially flat in order that a positive and total contact can be applied to the wire leads 22 engaged by the clip.

Integral with each side of each handle is an ear 23 that extends toward the opposed handle. The ears 23 of one handle are located on the inside of the ears of the opposed handle, as may be determined by referring to FIGURE 6. Each of the ears 23 of both handles 15 and 16 have an opening therein all of which are in linear alignment with the opening in each of the other ears. Extending through the openings of all the ears is a screw or shaft 24. A nut 25 is attached to the screw or shaft to hold the clip in the assembled condition as illustrated. A substantially U-shaped flat spring 26 is located between the two handles as may be again determined by referring to FIGURE 6. The bight 28 of the spring is adjacent the bights 13 and 14 of the body member 10 and 12. The legs 30 and the bight 28 of the spring 26 encircle the shaft 24.

As a result of the spring function and location the legs 17, 18, 19, and 20 are biased or urged to the normally closed position.

Although FIGURE 6 is a view taken from FIGURE 5, it is applicable as a cross-sectional view taken from FIGURES 1 through 5.

Also, the entire clip of each of the five forms illustrated, with the exception of the spring, is fabricated of aluminum.

The operation of the invention illustrated in FIGURE 1 is as follows: An electronic component 32 is placed in its environment which is an electrical or electronic circuit or on a printed circuit card or board. Prior to soldering, the clip is attached, by urging the legs 17, 18, 19, and 20 apart, to the leads 22 with the legs located on each side and closely adjacent to the component body per se. With the clip located in this manner the soldering of the leads proceeds. Such heat as is conducted through the leads toward the component 32 is transmitted through the four legs 17, 18, 19, and 20 and into the clip. In this manner the component is fully protected from the heat which, as is well known, can damage the component in such a manner as to cause the value thereof to change.

Attention is directed to the form of clip illustrated in FIGURE 2.

The two bodies broadly designated 40 and 41 are generally U-shaped or they may also be considered Y-shaped. The bodies 40 and 41 are hereafter referred to as the first and second body members, respectively. Extending from the apex, of each body member, formed by the legs 42, 43, 44, and 45 are handles 46 and 47. The extreme free end 48 and 49 of each handle is bent toward the opposed handle. Each pair of corresponding legs 42, 43, 44, and 45 midway between the free ends thereof and the apex are bent toward the opposed pair of legs in the manner shown. The reinforcing rib 50 is formed in each of the legs 43, 44, and 45 and a portion of the handles 46 and 47.

Each of the handles 46 and 47 have a pair of opposed ears 23 with openings therein that receive a shaft 51. The shaft is upset on each end thereof to prevent inadvertent removal. A spring is also located between the handles 46 and 47 that is identical to spring 26. The handles 46 and 47 pivot or rotate about the shaft 51 in the same manner as handles 15 and 16.

Again substantially total contact is made on the wire leads of the component 32 by the legs 42, 43, 44, and 45. The rib, of course, reduces the degree of resilience in the legs.

The operation of that form of invention illustrated in FIGURE 2 is the same as that illustrated in FIGURE 1.

Attention is now directed to the modified form of the invention illustrated in FIGURE 3.

The handle and related structure is identical to that illustrated in FIGURE 2. The modification appears in the legs.

Each leg 55, 56, 57, and 58 of each U-shaped body 59 and 60 has a short parallel spaced apart length or section 61, 62, 63, and 64. The bodies 59 and 60 are hereafter referred to as the first and second body members, respectively. Sections 61 and 62 being considered a pair and sections 63 and 64 being considered a pair define bights 65 and 66. Intermediate the ends, each leg is bent back upon itself and outwardly to provide an angular offset section or length 67 and 68, only two being shown. The legs are again bent back upon themselves to provide an elongated length 69, 70, 71, and 72. The lengths 69, 70, 71, and 72 are parallel with respect to pairs and are also parallel with respect to sections 61, 62, 63, and 64. However, sections 69, 70, 71, and 72 are spaced further apart than lengths 61, 62, 63, and 64. Each leg is substantially flat. Again a stiffening rib 50 is provided that extends from adjacent the free ends of sections 69, 70, 71, and 72 into a portion of the handles 46 and 47.

The configuration of the legs 55, 56, 57, and 58 provides for limited bending of each pair of opposed legs, i.e. 55 and 58 and 56 and 57, away from or toward the corresponding pair of opposed legs to accommodate varying sizes of components 32. Also, the fact that the legs are substantially flat enables a clip to be properly attached to the leads of one component when the adjacent components are in relatively close relationship.

The operation of that form of invention illustrated in FIGURE 3 is the same as for that illustrated in FIGURES 1 and 2.

Attention is directed to FIGURE 4 and the modified form of the invention there illustrated. Again the handle and related structure is identical to that illustrated in FIGURE 2. In this embodiment the bodies 90 and 91 are referred to as the first and second body members, respectively. Also, one pair of legs is identical to that illustrated in FIGURE 3.

Legs 75 and 76 each have a loop or a helix 77 and 78 therein adjacent the handle structure.

The function of this enables the legs to be bent inwardly or outwardly more than those legs illustrated in FIGURE 3. Also the fact that one pair of legs is substantially flat provides for the fact that components 32 may be in very close proximity on one side and not the other.

The operation of the device shown in FIGURE 4 is the same as that for the devices illustrated in the other figures.

FIGURE 5 shows another form of the invention in which the bodies 93 and 94 are referred to as the first and second body members, respectively. In this embodiment all four legs 80, 81, 82, and 83 are identical to legs 75 and 76 of FIGURE 4 wherein they include loops or helixes 84, 85, 86, and 87. Also the handle structure is identical to that form illustrated in FIGURES 2, 3, and 4.

The purpose of the legs 80, 81, 82, and 83 are the same as legs 75 and 76. The difference being that the components 32 may be further apart than in some of the forms of the invention illustrated.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A clip comprising: first and second body members fabricated of a metallic material; each of said body members including a handle portion and a pair of spaced leg portions; the leg portions of said first and second body members constituting flat narrow elements of rectangular cross-section; all of said leg portions including bend portions dividing each leg portion into inner and outer end portions; the bend portions formed in the leg portions of at least one of said body members constituting double reverse bends extending generally normal to the longitudinal extent of the leg portions in which the bends are located; a pin securing said first and second body portions together in assembled relation for pivotal movement between open and closed positions; in the closed position of said first and second body members the outer leg portions of said first body member having a predetermined contacting relation with corresponding outer leg portions of said second body member; and said bend portions allowing the distance between the corresponding outer leg portions of said first and second body members to be altered without altering said predetermined contacting relation.

2. A clip comprising: first and second body members fabricated of a metallic material; each of said body members including a handle portion and a pair of spaced leg portions; the leg portions of said first and second body members constituting flat narrow elements of rectangular cross-section; all of said leg portions including bend portions dividing each leg portion into inner and outer end portions; the bend portions in one set of said pair of spaced leg portions constitute double reverse bends extending generally normal to the longitudinal extent of said leg portions in which the bends are located and the bend portions in the other pair of spaced leg portions constituting complete loops; a pin securing said first and second body portions together in assembled relation for pivotal movement between open and closed positions; in the closed position of said first and second body members the outer leg portions of said first body member having a predetermined contacting relation with corresponding outer leg portions of said second body member; and said bend portions allowing the distance between the corresponding outer leg portions of said first and second body members to be altered without altering said predetermined contacting relation.

3. A clip comprising: first and second body members fabricated of a metallic material; each of said body members including a handle portion and a pair of spaced leg portions; the leg portions of said first and second body members constituting flat narrow elements of rectangular cross-section; all of said leg portions including bend portions dividing each leg portion into inner and outer end portions; the bend portions formed in each of said pair of said leg portions constitute complete loops; a pin securing said first and second body portions together in assembled relation for pivotal movement between open and closed positions; in the closed position of said first and second body members the outer leg portions of said first body member having a predetermined contacting relation with corresponding outer leg portions of said second body member; and said bend portions allowing the distance between the corresponding outer leg portions of said first and second body members to be altered without altering said predetermined contacting relation.

References Cited in the file of this patent

UNITED STATES PATENTS

| | | |
|---|---|---|
| 378,503 | Godfrey | Feb. 28, 1888 |
| 574,476 | Coy | Jan. 5, 1897 |
| 620,677 | Schuck | Mar. 7, 1899 |
| 1,310,587 | Sumersille | July 22, 1919 |
| 2,569,371 | Cohen | Sept. 25, 1951 |
| 2,838,817 | Wills | June 17, 1958 |
| 2,849,008 | Otten | Aug. 26, 1958 |
| 2,884,934 | Cochran | May 5, 1959 |
| 2,898,922 | Lyman | Aug. 11, 1959 |

FOREIGN PATENTS

| | | |
|---|---|---|
| 101,937 | Sweden | July 1, 1941 |